(12) United States Patent
Christophel

(10) Patent No.: US 10,894,623 B2
(45) Date of Patent: Jan. 19, 2021

(54) SERVOMOTOR DRIVEN PACKAGING APPARATUS AND METHOD OF CONTROL

(71) Applicant: Pouch Pac Innovations, LLC, Sarasota, FL (US)

(72) Inventor: Emmanuel K. Christophel, Punta Gorda, FL (US)

(73) Assignee: Pouch Pac Innovations, LLC, Sarasota, FL (US)

( * ) Notice: Subject to any disclaimer, the term of this patent is extended or adjusted under 35 U.S.C. 154(b) by 502 days.

(21) Appl. No.: 15/656,264

(22) Filed: Jul. 21, 2017

(65) Prior Publication Data

US 2018/0022494 A1  Jan. 25, 2018

Related U.S. Application Data

(60) Provisional application No. 62/364,958, filed on Jul. 21, 2016.

(51) Int. Cl.
| | |
|---|---|
| *B65B 65/02* | (2006.01) |
| *B65B 43/50* | (2006.01) |
| *B65B 57/12* | (2006.01) |
| *B65B 7/02* | (2006.01) |
| *B65B 57/16* | (2006.01) |
| *B65B 3/04* | (2006.01) |
| *B65B 1/04* | (2006.01) |

(Continued)

(52) U.S. Cl.
CPC .............. *B65B 65/02* (2013.01); *B65B 43/50* (2013.01); *B65B 57/12* (2013.01); *B65B 57/16* (2013.01); *B65B 1/04* (2013.01); *B65B 3/04* (2013.01); *B65B 7/02* (2013.01); *B65B 43/30* (2013.01); *B65B 43/36* (2013.01); *G05B 19/042* (2013.01)

(58) Field of Classification Search
CPC ......... B65B 65/02; B65B 57/12; B65B 57/16; B65B 57/00; B65B 43/30; B65B 43/50; B65B 43/36; B65B 1/04; B65B 3/04; B65B 3/34; B65B 7/02; B65B 19/28; B65B 35/26; B65B 59/005; B65B 59/00; B65B 59/001; B65B 59/003; B65B 59/02; G05B 19/042
See application file for complete search history.

(56) References Cited

U.S. PATENT DOCUMENTS

| | | | | |
|---|---|---|---|---|
| 4,128,985 A | * | 12/1978 | Simmons .............. | B65B 9/2021 53/502 |
| 4,206,788 A | * | 6/1980 | Susaki .................... | B65B 57/16 116/282 |

(Continued)

*Primary Examiner* — Thomas M Wittenschlaeger
(74) *Attorney, Agent, or Firm* — Dinsmore & Shohl LLP

(57) ABSTRACT

A filling and sealing machine configured for a flexible pouch having a turret, a servomotor, and a control unit is provided. The control unit includes a memory component having logic module stored within, a processor, and a user interface. The servomotor is connected to the turret and upon an instruction from the processor, rotates the turret. The set speed of the turret, the acceleration of the turret, and the deceleration of the turret may be modified by manual control parameters. The logic module includes preset recipe programs based upon the product being dispensed. Each preset recipe includes a different parameter for the servomotor to rotate the turret. The control unit may monitor the production system status and automatically adjust the speed, acceleration and/or deceleration of the turret to meet a desired production output.

18 Claims, 10 Drawing Sheets

(51) Int. Cl.
 *B65B 43/36* (2006.01)
 *B65B 43/30* (2006.01)
 *G05B 19/042* (2006.01)

(56) References Cited

U.S. PATENT DOCUMENTS

| | | | |
|---|---|---|---|
| 4,391,079 A * | 7/1983 | Cherney | B65H 23/1882 53/396 |
| 4,885,900 A * | 12/1989 | Lohr | B29C 65/18 53/551 |
| 5,209,044 A * | 5/1993 | D'Addario | B65B 3/04 53/272 |
| 5,283,506 A * | 2/1994 | Hoffmann | B65B 57/16 318/77 |
| 7,722,254 B2 | 5/2010 | Murray | |
| 7,954,307 B2 * | 6/2011 | Paunesku | B65B 1/363 53/459 |
| 8,366,855 B2 | 2/2013 | Murray | |
| 9,010,072 B2 * | 4/2015 | May | A22C 21/00 53/138.3 |
| 2007/0180794 A1 * | 8/2007 | Paunesku | B65B 59/02 53/455 |
| 2008/0072547 A1 | 3/2008 | Murray | |
| 2009/0301599 A1 * | 12/2009 | Miller | B65B 3/025 141/1 |
| 2015/0158614 A1 * | 6/2015 | Malick | A61J 3/074 53/468 |
| 2017/0275037 A1 * | 9/2017 | Berglin | B65B 61/205 |
| 2018/0297732 A1 * | 10/2018 | Hattori | B65B 5/04 |

\* cited by examiner

SERVOMOTOR DRIVEN PACKAGING APPARATUS AND METHOD OF CONTROL

CROSS REFERENCE TO RELATED APPLICATIONS

This application claims priority of U.S. Provisional Patent Application Ser. No. 62/364,958 filed on Jul. 21, 2016, which is incorporated herein by reference.

FIELD OF THE INVENTION

The present invention relates generally to a pouch filling apparatus and, more specifically, to a servomotor rotational fill-seal turret for premade pouches.

DESCRIPTION OF THE RELATED ART

Various types of pouch filling apparatuses are known. Most of these mechanical machines are only able to be used with one particular type of pouch at a time with a machine that only dispenses one particular type of product into the pouch per the customer's specification. Furthermore, these machines generally require some mechanical changes to accommodate any change to the type of product dispensed into the pouch. Moreover, conventionally known mechanical machines have a number of stations, the pouch stops at each station for an operation, and then the pouch is transferred to the next station in a binary, intermittent manner. For example, if the machine settings are for a pouch containing a liquid, the machine generally runs at a constant speed between the stations, stopping at each station to perform the task. Further, the machine generally performs each task at a constant rate and the pouch is advanced to the next station at a constant rate. For example, the machine motor is either on or off, therefore the machine is either stopped or advancing at a constant speed.

Yet, these intermittent stops are necessary to allow each station to finish its cycle before advancing the pouches as a single unit. As a result of these intermittent stops and starts, there is a 'schloss' effect where the contents of the pouch foam and/or splash in the top seal area of the pouch. Moreover, there is excessive wear and tear on the machinery as a result of the intermittent stops and starts. Furthermore, the machine cannot adopt quickly to a customer's specification for filling requirements or to a customer's request for a change in pouch shape. Thus, the lack of flexibility of machine capabilities in filling products and in pouch shape adaptability as well as the waste of the liquid product during the schloss effect makes the mechanical fill-seal machines less desirable. Therefore, there is a need in the art for a fill-seal machine with a consistent speed, improved flexibility in handling dispensing different products into different shaped pouches, a reduction of the slosh effect, and less wear and tear on the machinery.

SUMMARY OF THE INVENTION

In accordance with one embodiment, a filling and sealing machine configured for a flexible pouch is provided. The filling and sealing machine includes a turret, a servomotor, and a control unit. The turret includes a plurality of stations for positioning a plurality of flexible pouches at the plurality of positions along a path defined by the turret. The control unit includes a memory component having logic module, a processor, and a user interface. The servomotor is connected to the turret and upon an instruction from the processor, rotates the turret.

In accordance with another embodiment, a system for a filling and sealing machine configured for a flexible pouch is provided. The system includes a turret, a servomotor, and a control unit. The turret includes a plurality of stations for positioning a plurality of flexible pouches at the plurality of positions along a path defined by the turret. The servomotor is connected to rotate the turret. The control unit includes a memory component, a data storage component, a processor, and a local interface. The processor is connected to the memory component, the data storage component, and the local interface. The memory component stores the logic module. The data storage component includes a production data storage. A plurality of sensors are configured to monitor a production process. The plurality of sensors provides the production data storage with production data. The logic module monitors the production data. The logic module is executed by the processor, and upon a command, rotates the turret in a first direction at a predetermined set speed.

In accordance with another embodiment, a method for filling and sealing machine configured for a flexible pouch is provided. The method includes selecting a recipe from a user panel. A subroutine is chosen as determined by the recipe selection. A control unit instructs a servomotor to execute a predetermined program based upon the subroutine chosen. The servomotor rotates a turret in a first direction at a predetermined speed between a plurality of stations. The predetermined speed is determined by an index time and a dwell time. The index and dwell times are configured to match the recipe and the subroutine chosen. The servomotor reacts to the dwell time and the index time producing a speed greater than a predetermined threshold speed or reacts to the dwell time and index time producing a longer ramp up acceleration and a longer ramp down deceleration.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION OF THE PREFERRED EMBODIMENTS

Figure 1:
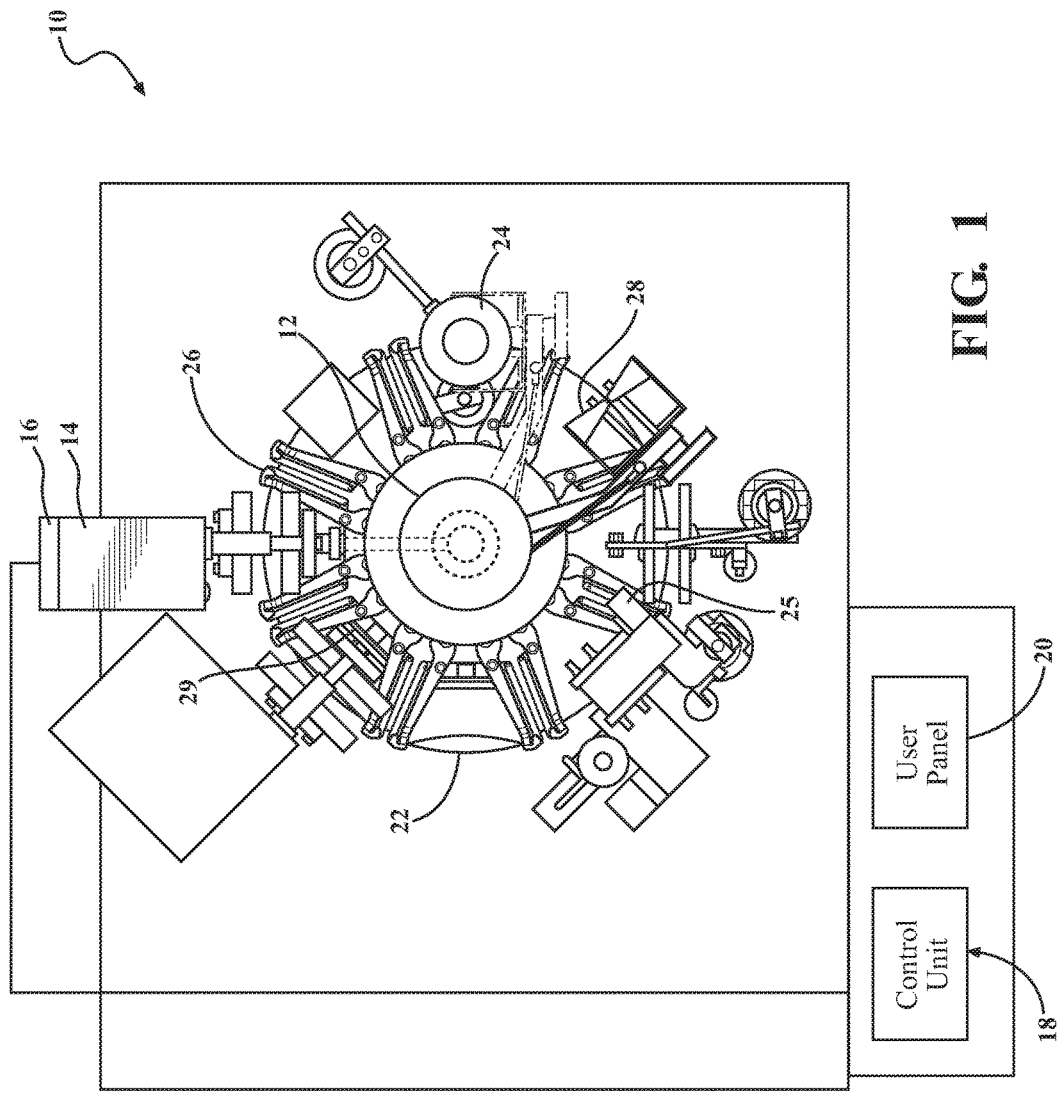
FIG. 1 schematically depicts a top view of a filling and sealing machine having a turret, a servomotor, an encoder, a control unit and a panel, according to one or more embodiments described and illustrated herein.

FIG. 1 schematically depicts a top view of a filling and sealing machine having a turret, a servomotor, an encoder, a control unit, and a user panel. Premade flexible pouches are loaded into the turret and the turret is rotated by a servomotor to each station. For instance, at the filling station, an opened pouch is moved into position and the pouch is filled with a product. The frequency that the pouch is moved to the filling station, the time the turret takes to rotate the pouch into and out of the filling station, and the speed of the turret, among other options, are selectable from the user panel based upon the type of product being filled into the pouches. It should be appreciated that while the pouch being referred to herein is a premade pouch, a non-premade pouch may also be used.

Generally, the type of product that may be dispensed into the pouch is a liquid recipe, a dry recipe, or a standard 'catch-all' recipe. As a result, the panel is preprogrammed with three user selections: Standard Operation, Liquid Operation, and Dry Operation. Within the Standard Operation and the Liquid Operation, a user may select, at the user panel, one of the following three modes: 'Constant Mode', '25% Mode', or '50% Mode'. Based on the user selection, the servomotor and turret will behave according to a predetermined program routine. With reference to the Dry Operation, the user inputs a required number of fills per minute and the system continuously monitors itself through upstream and downstream sensors and other components that can relay information back to the control unit. As a result, the control unit will instruct the servomotor to adjust the speed and/or the acceleration and deceleration time of the turret automatically to fulfill the required number of fills per minute.

Referring to FIG. 1, a schematic depiction of a top view of a filling and sealing machine 10 having a turret 12, a servomotor 14, an encoder 16, a control unit 18 and a user panel 20 is illustrated. The turret 12 of the filling and sealing machine 10 is driven by a servomotor 14. The control unit 18 instructs the servomotor 14 to rotate the turret 12. The control unit 18 is in communication with the user panel 20.

The filling and sealing machine 10 further includes an opening station 24, in order to separate the upper edges of the pouch. Various techniques are conventionally known in the art for further opening the pouch 22 such as grippers 26. Other techniques, such as suction cups or the like may be utilized to open the pouches.

In addition, a nozzle 28 may be mechanically lowered into the pouch 22 to direct a stream of compressed gas downwardly into the pouch 22 to force the walls of the pouch away from each other to further open an upper edge of the pouch. An example of a gas is carbon dioxide or nitrogen. The pouch 22 is then fully opened. The filling and sealing machine 10 further includes a filling station 25 and a sealing station 29.

Figure 2:
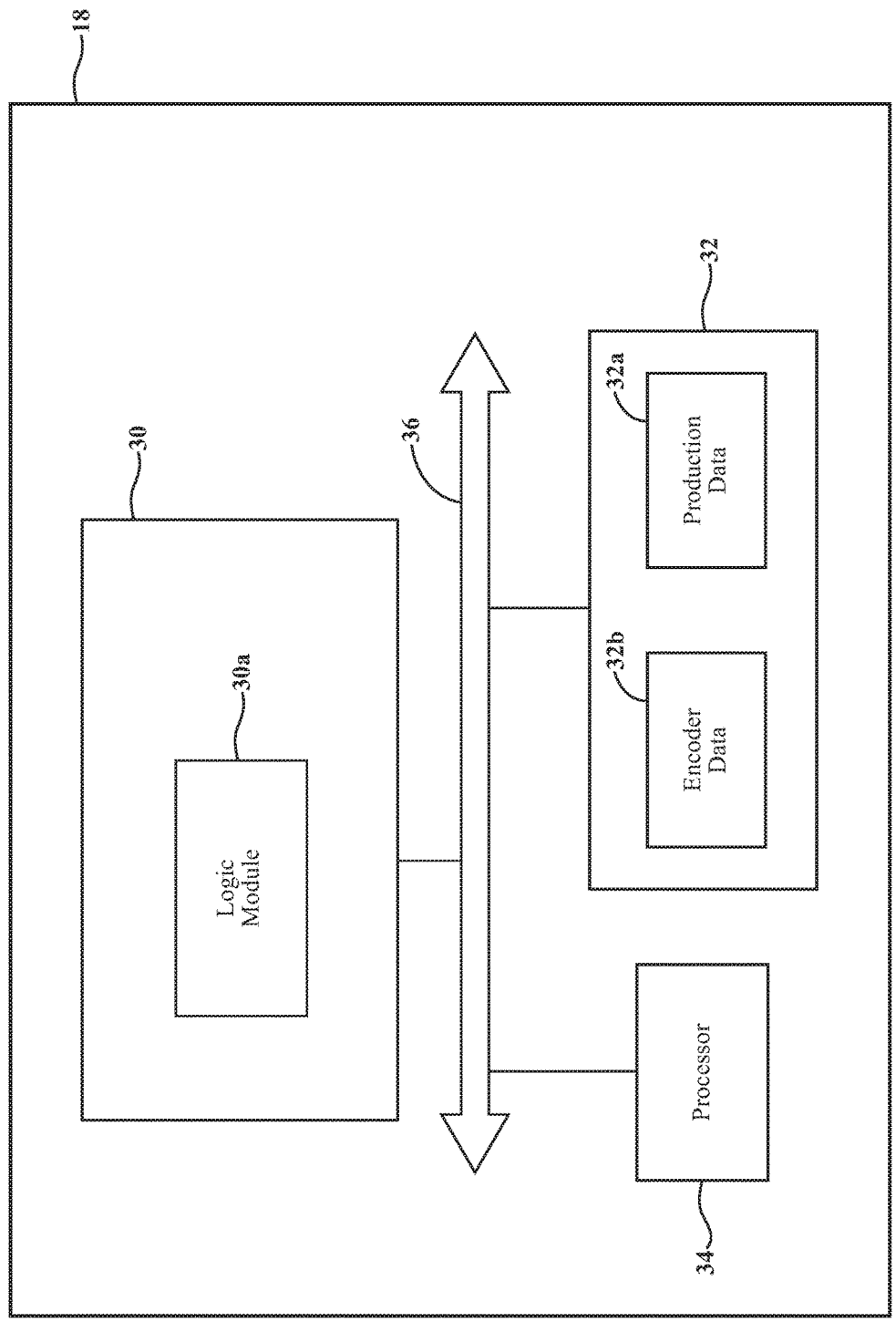
FIG. 2 schematically depicts the control unit of the filling and sealing machine of FIG. 1, in isolation, according to one or more embodiments described and illustrated herein.

FIG. 2 schematically depicts the control unit 18 of the filling and sealing machine 10. The control unit 18 includes a memory component 30, a data storage component 32, a processor 34, and a local interface 36.

In some embodiments, the processor 34 includes processing components operable to receive and execute instructions (such as from the memory component 30 and/or the data storage component 32).

The memory component 30 stores the logic module 30a. The logic module 30a includes a plurality of different pieces of logic, each of which may be embodied as a computer program, firmware, and/or software/hardware.

The logic module 30a is executable by the processor 34. The logic module 30a may have a plurality of preset programming choices, as discussed below, with each of the plurality of preset programming choices executed by the processor 34. It should be appreciated that the logic module may be edited or modified to change any of parameters therein. Moreover, the edits may automatically occur from data transmitted to the data storage component 32 or from an outside influence, such as a human programmer.

The data storage component 32 includes a production data storage 32a and an encoder data 32b storage. The data storage component 32 is in communication with the memory component 30 and with the processor 34. The production data storage 32a is an input from the production monitoring system (not illustrated). The production monitoring system monitors the machine performance variables using sensors and other data gathering inputs known to those skilled in the art, such as, without limitation, the status of downstream production, the status of upstream production, the amount of a product remaining, and remaining filling time of a pouch 22. The encoder data 32b stores data output from the servomotor 14 that will be apparent to those skilled in the art.

The local interface 36 is implemented as an Ethernet connection, DeviceNet, a bus or other communication interface to facilitate communication among the components of the control unit 18.

It should be understood that while the components of FIG. 2 are illustrated as residing within the control unit 18, this is merely an example thereof. In some embodiments, one or more of the components may reside external to the control unit 18. It should also be understood that while the control unit 18 is illustrated as a single device, this is also merely an example. In some embodiments, the logic module 30*a* may reside on different computing devices.

With reference to FIGS. 1 and 2, the filling and sealing machine 10 operations occur from above the pouch 22. The filling and sealing machine 10 includes a turret 12, mounted on the turret 12 is a pouch carrier (not shown) that simultaneously moves a plurality of pouches, arranged in a predetermined manner, such as transversely in a row, through each of the stations.

The logic module 30*a* stored in the memory component 30 is executed by the processor 34, which then executes an instruction to activate the servomotor 14. The logic module 30*a* uses an index time and a dwell time to activate and instruct the servomotor 14. Further, the speed of the servomotor may be adjusted as well as the acceleration and deceleration into and out of a plurality of stations. As discussed in detail below, upon an instruction from the processor 34, the servomotor 14 rotates the turret 12 in a predefined direction at a predetermined set speed. The logic module 30*a* has preprogramed instructions, that based on the recipe type, a desired production output, and/or control parameters, that a user may select from the user panel 20.

Once the open pouch 22 is rotated into one of the plurality of stations, for example, the filling station 25, the logic module 30*a* prohibits the servomotor 14 from rotating the turret 12 until a known predetermined time has passed. This is generally known as the dwell time. The dwell time allows for enough time so that a product may be dispensed into the pouch 22. Once the dwell time has been met, the logic module 30*a* permits the processor 34, through an instruction to the servomotor 14, to rotate the turret 12 to the next station where the process is repeated.

The logic module 30*a*, servomotor 14, and processor 34 allows for control parameters of the turret 12 to be modified such as, without limitation, an acceleration of the turret 12, a deceleration of the turret 12, and/or a higher set speed. This versatility and precision allows for an improved consistency between stations. Moreover, there is an improvement into the flexibility of accommodating different filling products into differently shaped pouches. In addition, because of the flexibility to adjust the acceleration and decelerations of the turret 12, there is a significant reduction in the waste of the product that may foam, splash, or spill out from the top seal area of the pouch 22 when filling and transporting the pouches 22 during the manufacturing process. Thus, the pouches 22 may be filled to a higher level with little or no waste.

As is known in the art, servomotors 14 allow for a precise output, in which the speed of rotation may increase between stations. The increase in speed allows for a better repetitive manufacturing process and a higher production output. In some embodiments, the logic module 30*a* and the processor 34 automatically adjust the speed, acceleration, and/or deceleration of the servomotor 14 based upon inputs received from the production data storage 32*a*. The speed of the turret 12 is adjusted to meet the set number of fills per minute by determining the optimum speed required.

Further details on how the logic module 30*a*, processor 34 and servomotor 14 rotate the turret 12 are described below. It should be appreciated that through the logic module 30*a*, the control parameters for the servomotor 14 can be programed in a plurality of ways. For instance, the dwell time and the index time can be varied while keeping the total cycle or complete revolution of the turret 12 constant. The cycle time can be changed based on the rate of delivery of product to the turret 12. Thus, if product is being delivered at a rate of one unit per second and that rate slows, the speed of the cycle time can be slowed. Additionally, the ramp up (acceleration) and ramp down (deceleration) time can be modified to have an infinite number of variations and/or combinations.

Moreover, while the preset routines and subroutines described below has a constant dwell and constant index time, it should be appreciated that these may infinity vary. The dwell time may be maintained, it may be increased, or it may be decreased. Thus, the fill times may be extended, made shorter, or kept constant, modes In other words, the control parameters in the logic module 30*a* may be modified in a plurality of techniques outside of the three preset operations and corresponding subroutines that are discussed below.

Figure 3:
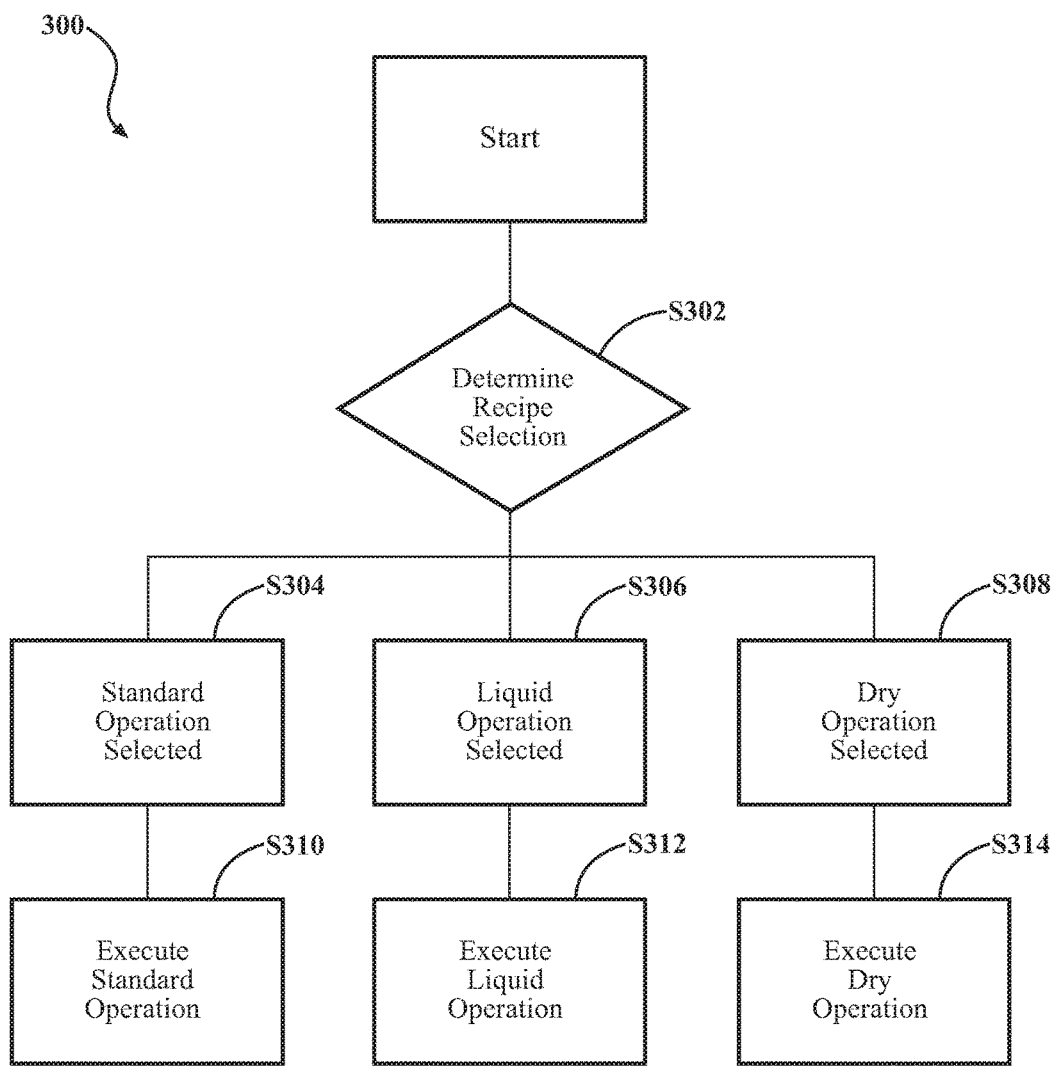
FIG. 3 is a flowchart depicting a method of executing a Standard Operation, a Liquid Operation, or a Dry Operation, according to one or more embodiments described and illustrated herein.

Referring to FIG. 3, a flowchart 300 depicting a method of executing the Standard Operation, the Liquid Operation, or the Dry Operation is illustrated. The flowchart 300 depicted in FIG. 3 is executed by the logic module 30*a* stored in the memory component 30 in the control unit 18. The logic module 30*a* has predetermined routines assigned to each recipe selection. The process selections of the flowchart 300 of FIG. 3 are selected by the user at the user panel 20 which, in turn, the selected subroutine in the logic module 30*a* is executed by the processor 34, instructing the servomotor 14 to rotate the turret 12 in a predefined manner.

In step S302 of FIG. 3, a user determines which recipe to select depending on the type of product to be dispensed into the pouch. If the user selects, in step 304, the Standard Operation, the Standard Operation program will execute in step 310. If a user selects, in step 306, the Liquid Operation, the Liquid Operation program will execute in step 312. If a user selects, in step 308, the Dry Operation, the Dry Operation program will execute in a step 314. Each of the executed operations 310, 312, 314 will proceed into an individual routine based upon the selection, and may provide the user with additional choices that are specific to the executed operation selected at steps 310, 312, 314, as discussed below.

Figure 4A:
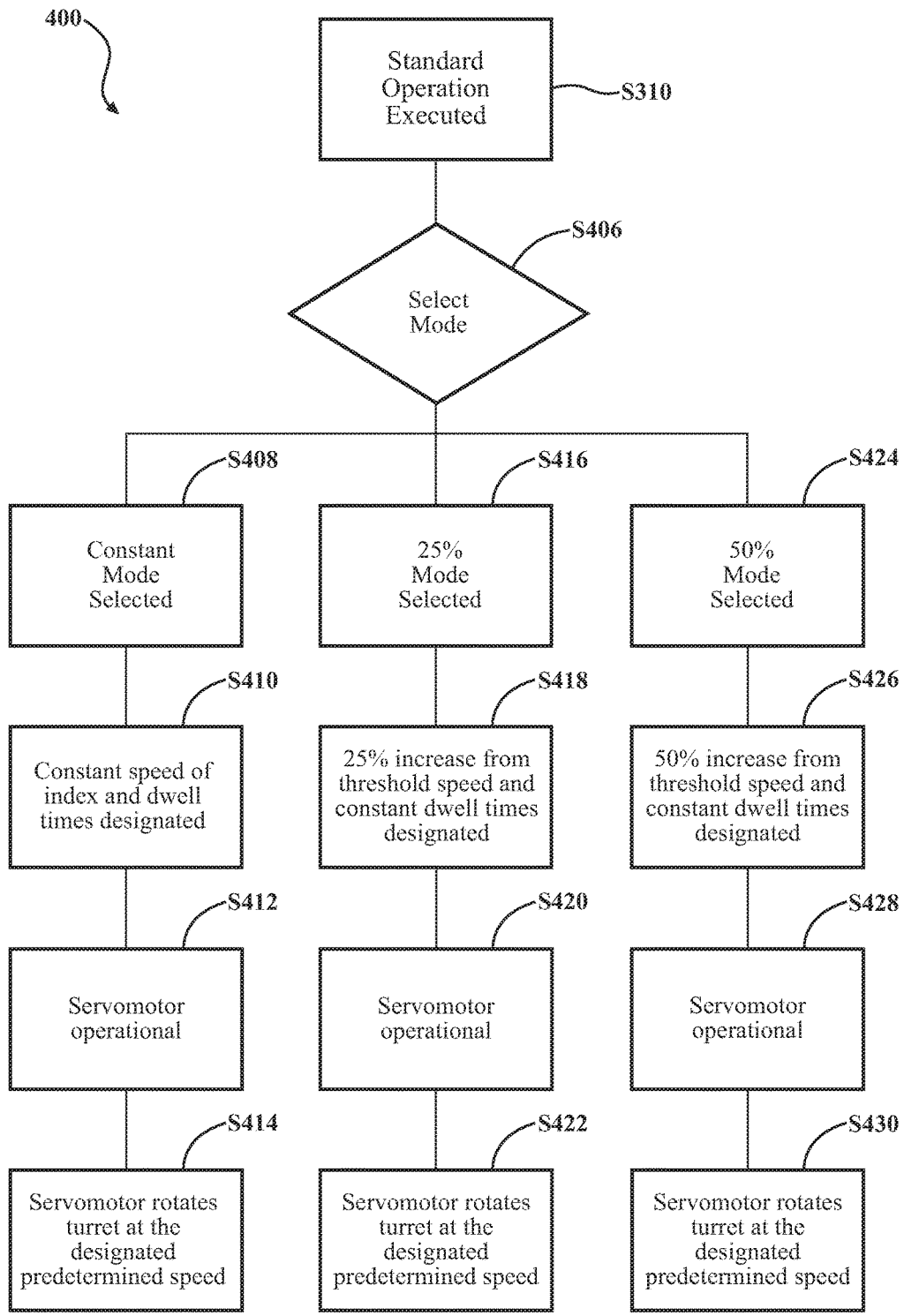
FIG. 4A is a flowchart depicting a method of executing a Standard Operation of FIG. 3, according to one or more embodiments described and illustrated herein.

Referring to FIG. 4A, a flowchart 400 depicting a method of executing the Standard Operation is illustrated. The flowchart 400 depicted in FIG. 4A is the Standard Operation subroutine of the logic module 30*a* executed by the processor 34. The logic module 30*a* has predetermined subroutines assigned to the Standard Operation recipe selection. The process selections of the flowchart 400 of FIG. 4A are selected by a user at the user panel 20, which, in turn, the selected subroutine in the logic module 30*a* is executed by the processor 34 to instruct the servomotor 14 to rotate the turret 12 in a predefined manner.

In Step 310 of FIG. 3, the Standard Operation recipe has been selected and is executing. The user is prompted to select, at the user panel 20, in step 406, a subroutine mode. The preprogrammed subroutine modes for the Standard Operation are as follows: Standard Constant Mode, Standard 25% Mode, or Standard 50% Mode. Based on the user selection, the logic module 30*a* instructs the servomotor 14 and thus the machine 10 to behave according to a predetermined program routine.

For example, if the user selects, in step 408, the Standard Constant Mode, the logic module 30*a* loads the corresponding predetermined subroutine and designates the subroutine, at step 410, having a constant rate of dwell and a constant rate of index times to the processor 34. The processor 34 then executes the subroutine by sending a signal, at step 412, instructing the servomotor 14 to initiate operations. The servomotor 14, at step 414, rotates the turret 12 using normal index and dwell times at a set threshold speed.

On the other hand, if the user selects, in a step 416, the Standard 25% Mode, the logic module 30a loads the corresponding predetermined routine and designates the subroutine, at step 318, having a 25% increase in speed faster than the set threshold speed to the processor 34. The processor 34 then executes the subroutine by sending a signal, at step 420, instructing the servomotor 14 to initiate operations. The servomotor 14, at step 322, rotates the turret 12 at a 25% faster set speed than the set speed threshold, while maintaining the same dwell time as the Standard Constant Mode routine.

As a result, the Standard 25% Mode allows for the production line to realize higher output rates while keeping the fill times constant. This allows for the maximum time possible for the filling product into the pouches. In a non-limiting example, the servomotor 14 may rotate the turret 12 at an index rate as if the turret is running at approximately 43 pouches per minute but the dwell time for filling the pouches is set as if the turret is only running 35 pouches per minute. Thus, the Standard 25% Mode allows for faster travel between stations without decreasing the product fill time.

If the user selects, in a step 424, the Standard 50% Mode, the logic module 30a loads the corresponding predetermined routine and designates the proper subroutine, at step 426, having a 50% increase in speed from the set speed threshold to the processor 34. The processor 34 then executes the subroutine by sending a signal, at step 428, instructing the servomotor 14 to initiate operations. The servomotor 14, at step 430, rotates the turret 12 at a 50% faster set speed than the set speed threshold, while maintaining the same dwell time as the set speed threshold.

The Standard 50% Mode allows for even greater output rates while keeping the fill times of each pouch constant. In particular, the servomotor 14 increases the speed of the turret 12 during the index by 50% without any change to the dwell time resulting a much faster transfer, thus allowing for the production line to realize higher output rates while still keeping the fill times constant at the maximum allotted time. In a non-limiting example, the servomotor 14 may index the turret 12 as if it is running at approximately 52 pouches per minute but the dwell time for filling the pouch is set as if the turret is only running 35 pouches per minute. Therefore, the Standard 50% Mode allows for an even faster travel between stations without decreasing the product fill time.

Figure 4B:
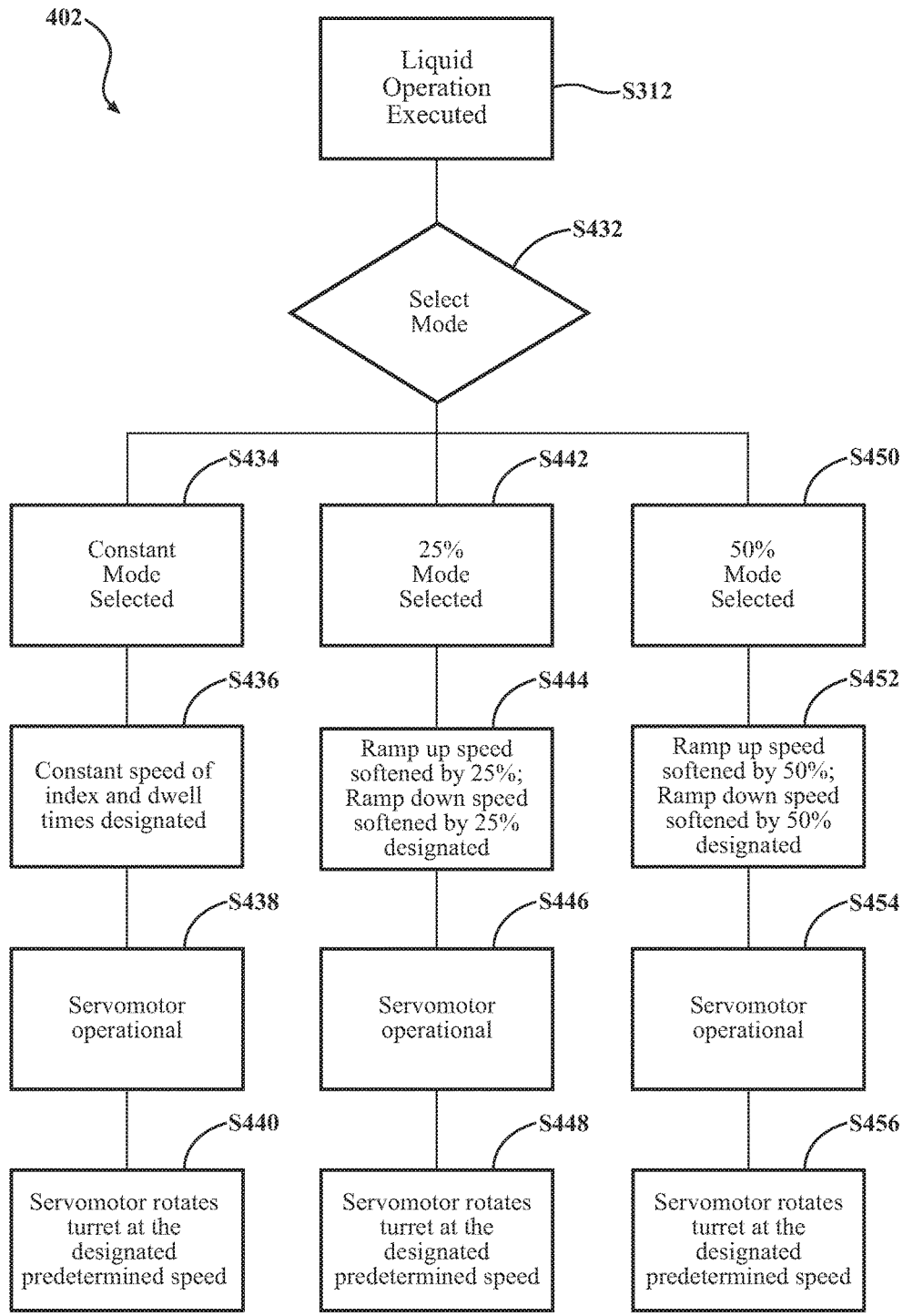
FIG. 4B is a flowchart depicting a method of executing a Liquid Operation of FIG. 3, according to one or more embodiments described and illustrated herein.

Referring to FIG. 4B, a flowchart 402 depicting a method of executing the Liquid Operation is illustrated. The flowchart 402 depicted in FIG. 4B is the Liquid Operation subroutine of the logic module 30a executed by the processor 34. The logic module 30a has predetermined subroutines assigned to the Liquid Operation recipe selection. The process selections of the flowchart 400 of FIG. 4B are selected by the user at the user panel 20. As a result of the selection, the selected subroutine of the logic module 30a is executed by the processor 34 instructing the servomotor 14 to rotate the turret 12 in a predetermined manner.

In Step 312 of FIG. 3, the Liquid Operation recipe has been selected and is executing. The user is prompted to select at the user panel 20 in step 432, a subroutine mode. The preprogrammed subroutine modes for the Liquid Operation are as follows: Liquid Constant Mode, Liquid 25% Mode, or Liquid 50% Mode. Based on the user selection, the logic module 30a instructs, through the processor 34, the servomotor 14 and thus the machine 10 to behave according to a predetermined program routine.

For example, if the user selects, in step 434, the Liquid Constant Mode, the logic module 30a loads the corresponding predetermined subroutine and designates the subroutine, at step 436, having a constant rate of dwell and a constant rate of index times to the processor 34. The processor 34 then executes the subroutine by sending a signal, at step 438, instructing the servomotor 14 to initiate operations. The servomotor 14, at step 440, rotates the turret 12 using normal index and dwell times at a set speed threshold.

However, if the user selects, in a step 442, the Liquid 25% Mode, the logic module 30a loads the corresponding predetermined subroutine and designates the subroutine, at step 444, having an elongated or gradual ramp up acceleration speed and an elongated or gradual ramp down deceleration speed of the index by 25%. In other words, the acceleration to achieve the set threshold speed takes 25% longer than the Liquid Constant Mode under the normal index time. Similarly, the gradual deceleration from the set threshold speed to the dwell time takes 25% longer than Liquid Constant Mode under the normal index time. The processor 34 executes the subroutine by sending a signal, at step 446, instructing the servomotor 14 to initiate operations. The servomotor 14, at step 448, rotates the turret 12 with the gradual ramp up acceleration and gradual ramp down deceleration speeds. Further, the set threshold speed of the Liquid Constant Mode may be exceeded. However, under the Liquid 25% Mode, the dwell time to fill the pouch generally remains the same as it was with the Liquid Constant Mode.

As a result of the gradual ramp up acceleration and the gradual ramp down deceleration speeds, there is a much less likelihood for the liquid product to slosh out of the open pouch upon the acceleration or the deceleration of the turret 12. Further, the liquid product added to the pouches 22 may now be filled to a higher level within the pouch 22 and will not internally splash against the inside walls of the pouch as much, a common occurrence in liquid fills. Under this subroutine, the loss of the liquid product or 'schloss' effect is minimized therefore the set speed of the turret may be increased, similar to the Standard 25% Mode or the Standard 50% mode, as discussed earlier.

On the other hand, if the user selects, in a step 450, the Liquid 50% Mode, the logic module 30a loads the corresponding predetermined subroutine and designates the subroutine, at step 452, having an elongated or gradual ramp up acceleration speed and an elongated or gradual ramp down deceleration speed of the index by 50%. In other words, the acceleration to achieve the set threshold speed takes 50% longer than the time it takes the Liquid Constant Mode to accelerate to the set threshold speed under the normal index time. Similarly, the deceleration from the set speed threshold to the dwell time takes 50% longer than the time it would take the Liquid Constant Mode under the normal index time. The processor 34 executes the subroutine by sending a signal, at step 454, instructing the servomotor 14 to initiate operations. The servomotor 14, at step 456, rotates the turret 12 with the gradual ramp up acceleration and gradual ramp down deceleration speeds. Further, because of the elongated ramp acceleration, the set speed in the Liquid 50% Mode may exceed the set threshold speed of the Liquid Constant Mode; however, the dwell time to fill the pouch generally remains the same as it was with the set speed threshold.

Due to the Liquid 50% Mode allowing for an even more gradual ramp up acceleration and ramp down deceleration of the turret 12, there is a much less likelihood of the liquid product sloshing out or splashing internally amongst the interior walls of the pouch 22. Further, the pouches 22 may be filled to a higher level as the 'schloss' effect that occurs upon acceleration and deceleration is minimized. Therefore, the set speed may be increased, similar to the Standard 25% Mode or the Standard 50% mode, as discussed earlier.

Figure 4C:
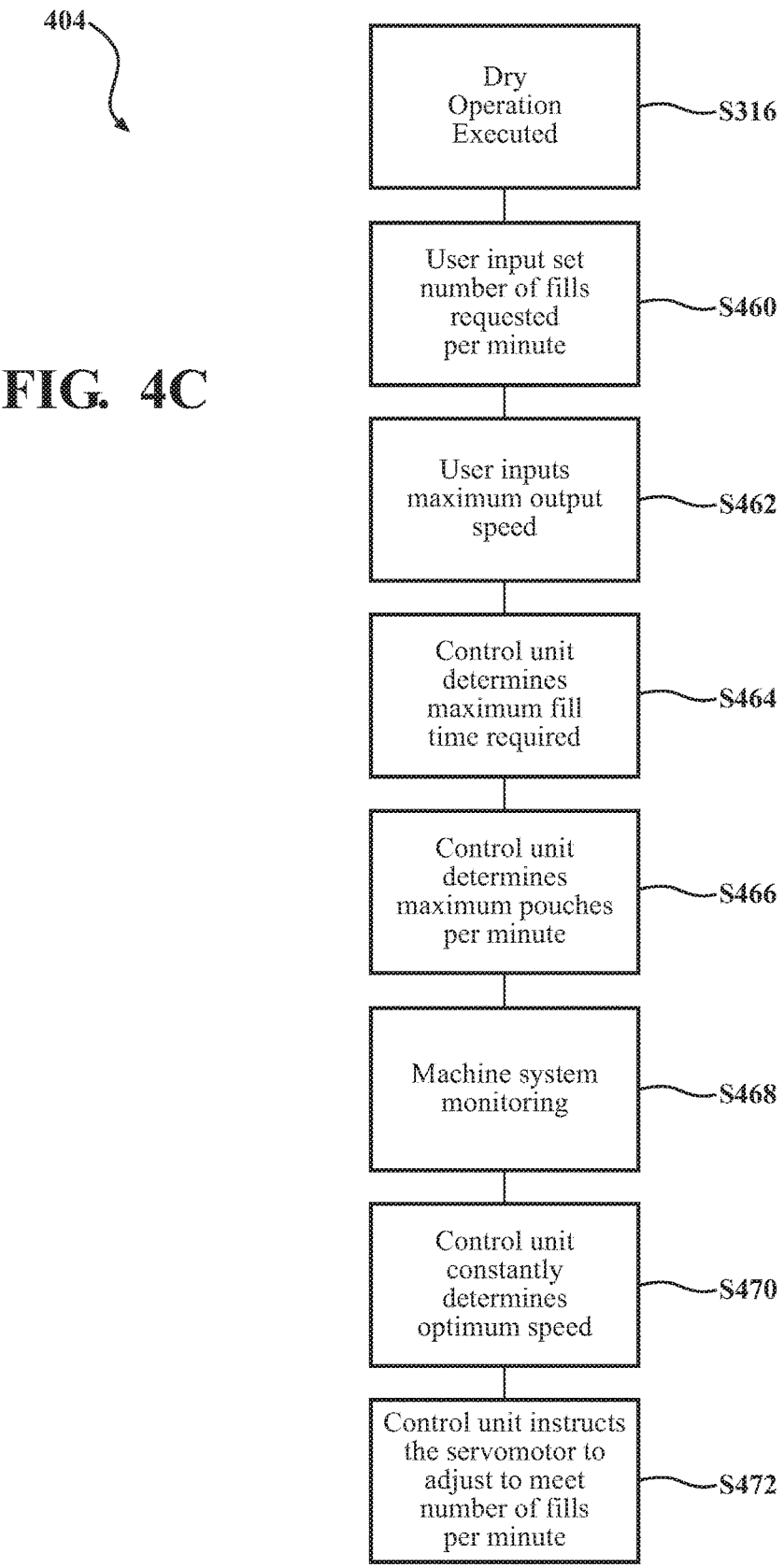
FIG. 4C is a flowchart depicting the execution of the Dry Operation of FIG. 3, according to one or more embodiments described and illustrated herein.

Referring to FIG. 4C, a flowchart 404 depicting a method of executing the Dry Operation is illustrated. The flowchart 404 depicted in FIG. 4C is the Dry Operation subroutine of the logic module 30a is executed by the processor 34. The logic module 30a has a predetermined subroutine assigned to the Dry Operation recipe selection. The process selections of the flowchart 404 of FIG. 4C are input by the user at the user panel 20, which in turn the logic module 30a selects the parameters, the parameters are executed by the processor 34.

In Step 316 of FIG. 3, the Dry Operation recipe has been selected and is executing. The user is prompted to input at the user panel 20, in step 460, the required number of pouches 22 to be filled per minute. Next, the user may optionally input, in step 362, the maximum output speed. The maximum output speed restricts the turret 12 from rotating above a set threshold speed. Based upon the required number of fills per minute, the logic module 30a determines, at step 364, the maximum fill time required and then determines, at step 366, the maximum pouches 22 per minute that can be filled.

The production data storage 32a of the data storage component 32 monitors the production system, at a step 468, for machine performance variables using sensors and other data gathering inputs known to those skilled in the art, such as, without limitation, the status of downstream production, the status of upstream production, the amount of a product remaining, and filling time. Based on the production system, at step 470, the logic module 30a constantly determines what the optimum speed of the turret 12 and the acceleration and deceleration speed should be for any given particular product. At step 472, the logic module 30a may instruct the servomotor 14 to, without limitation, slow down, speed up, ramp up acceleration, ramp up deceleration, ramp down acceleration, or ramp down deceleration to meet the required number of pouches to be filled as requested earlier in step 460.

In other words, the Dry Operation selection triggers the system to run at a constant speed, automatically determining, based upon the user's inputted number of fills per minute, the speed necessary to reach the set number of fills per minute. Therefore, the system automatically determines and adjusts itself to optimize the flow of product through the complete product line, meaning that the system will automatically maximize the fill time required while maximizing the pouches 22 per minute that the system can produce based on the fill time. If the user inputs a maximum output speed, the logic module 30a prohibits the servomotor 14 from rotating the turret 12 beyond a set speed threshold; thus, reducing the maximum number of pouches filled per minute.

Further, it should be appreciated that because of the flexibility in the speed and accelerations parameters discussed herein, the dispensing of the dry product may actually begin prior to the pouch 22 being in the filing station 25. The dry product may be released into the transfer funnel (not illustrated) between a scale and/or auger (not illustrated) and the machine 10 prior to the pouch 22 arrival in the filling station 25 so that when the servomotor 14 rotates the turret 12 into the filling station 25, the product starts dispensing. The same may occur at the end of the filling process, when the servomotor 14 rotates the turret 12 into the next station, the turret 12 may rotate while the funnel lifts so no additional filling time is required and the speed of the turret 12 is not changed.

Figure 5A:
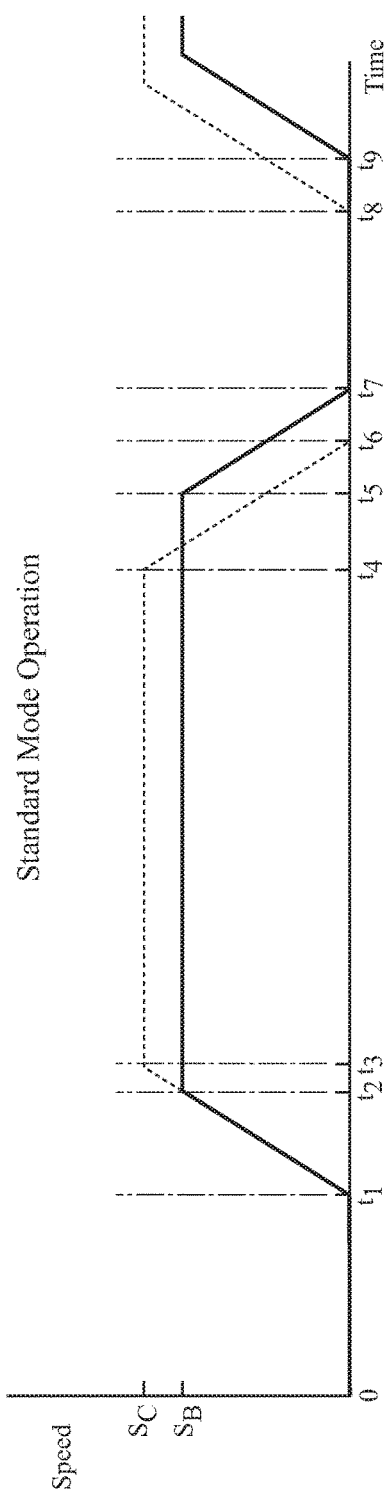
FIG. 5A is a graphical representation of the Standard Operation depicting the Standard Constant Mode and the Standard 25% Mode of FIG. 4A, according to one or more embodiments described and illustrated herein.

FIG. 5A is a graphical representation of the Standard Mode Operation recipe of step 310 depicting the Standard Constant Mode and the Standard 25% Mode of FIG. 4A. The abscissa is the total time of the operation and includes both the index and the dwell times. The ordinate is the speed in which the turret 12 is rotated. The solid line indicates the Standard Constant Mode having a set threshold speed and the dashed line indicates the Standard 25% Mode where the speed of the turret 12 is increased. The speed threshold SB is provided as the upper speed limit for the Standard Constant Mode and the set speed threshold SC is the upper limit for the Standard 25% Mode. As discussed earlier, the turret 12 is stationary, or at a dwell during the filling process, and the dwell time remains constant between the two modes. For the purposes of this graph and for ease of explanation, the intersection of the ordinate and the abscissa is at some period of time during the first cycle within the filling process, at a dwell time, where the turret 12 is stationary.

As illustrated, both modes index the turret 12 into an acceleration after filling the pouch 22 at time T1. The rate of acceleration is equal between both modes. At time T2 the Standard Constant Mode has achieved the SB limit, thus stopped in its acceleration, but continues to rotate the turret 12, maintaining the SB speed until T5, when the Standard Constant Mode begins deceleration into the dwell time at T7. On the other hand, the Standard 25% Mode continues to accelerate the turret 12 until SC is achieved at time T3. At the SC limit, the turret 12 speed is maintained until T4, when the turret 12 is decelerated until T6, when the turret 12 is at dwell time. Due to the faster set speed SC, the Standard 25% Mode is able to rotate the turret 12 into the next station quicker. The dwell times of the Standard Constant Mode, between time T7 and T9, are equal to the dwell times of the Standard 25% Mode between T6 and T8.

In addition, the third subroutine choice, the Standard 50% Mode (not illustrated), would follow the same initial acceleration at the Standard Constant Mode and the Standard 25% Mode, but would continue the acceleration of the turret 12 to a set speed that is beyond the set speed SC at T3, where the SC speed is constant. As a result, the increased turret 12 speed rotates faster into the next station and begins the deceleration before the time T4 where the Standard 25% Mode begins deceleration. The dwell times remain the same between any of the three modes while the pouches 22 are filled with the product. Therefore, the Standard 50% Mode would rotate the turret 12 and the pouch fastest station-to-station than the Standard Constant Mode and the Standard 25% Mode.

It should be appreciated that the Standard Operation Mode is not limited to the preset modes as described above. The Standard Operation may be have a set speed valve in any range, including above the Standard 50% Mode, between the Standard 50% Mode and the Standard Constant Mode, or below the Standard Constant Mode. Further, based on the product being dispensed and/or the pouch 22, the dwell time may also be adjusted to fit the product fill time of the pouch.

Figure 5B:
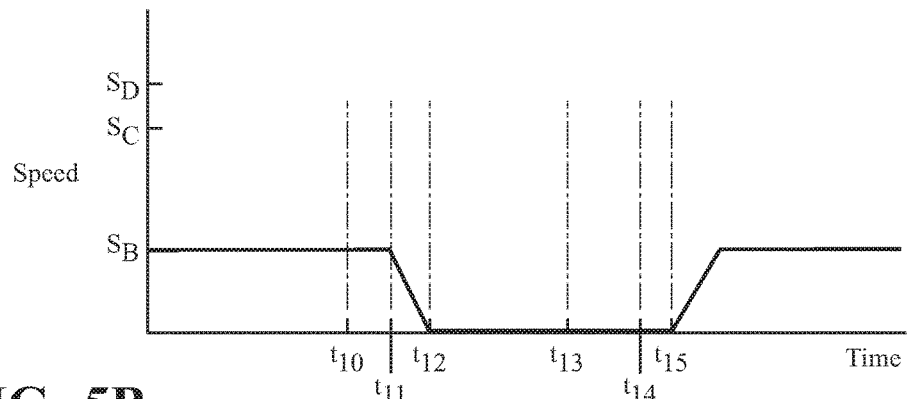
FIG. 5B is a graphical representation of the Standard Operation Mode station-to-station operation of FIG. 4A, according to one or more embodiments described and illustrated herein.
Figure 5C:
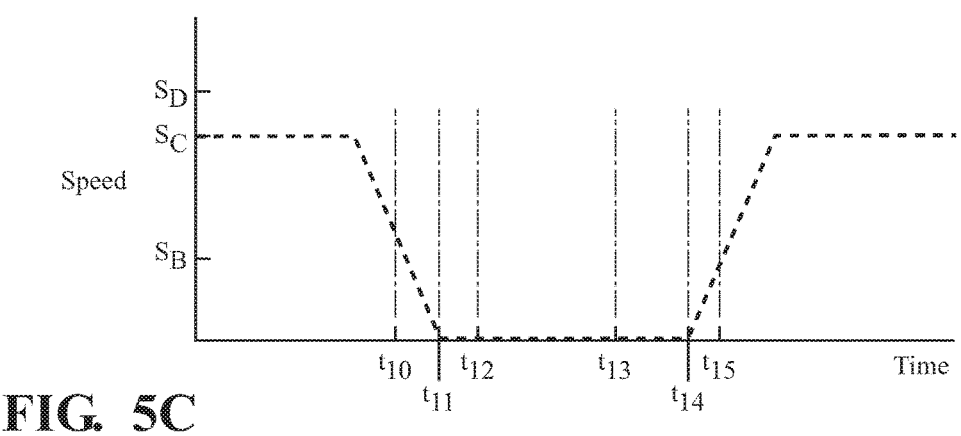
FIG. 5C is a graphical representation of the Standard 25% Mode station-to-station operation of FIG. 4A, according to one or more embodiments described and illustrated herein.
Figure 5D:
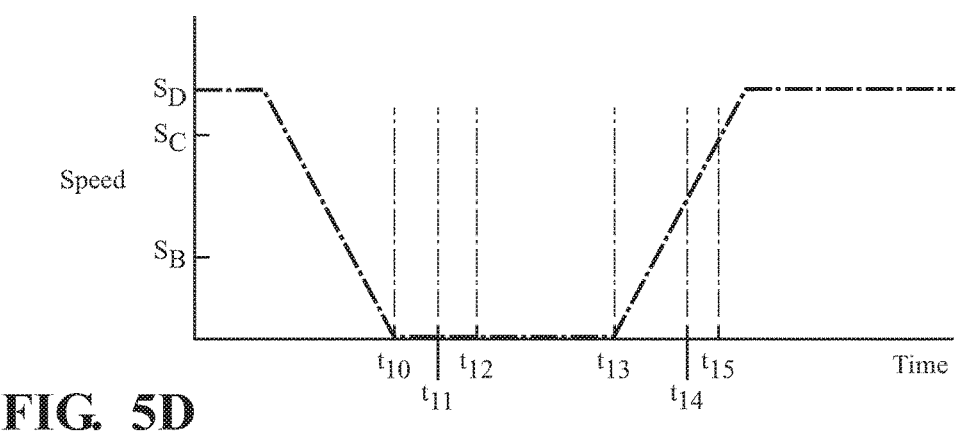
FIG. 5D is a graphical representation of the Standard 50% Mode station-to-station operation of FIG. 4A, according to one or more embodiments described and illustrated herein.

FIGS. 5B, 5C, and 5D are a graphical representation of the Standard Operation Mode, the Standard 25% Mode, and the Standard 50% Mode illustrated as a comparison of a station-to-station rotation of the turret of FIG. 4A. The abscissa is the total time of the operation and includes both the index and the dwell times. The ordinate is the speed in which the turret is rotated. The solid line of FIG. 5B indicates the Standard Constant Mode having a set threshold speed SB. The dashed line of FIG. 5C indicates the Standard 25% Mode where the speed of the turret is increased to a 25% higher set speed SC than the SB threshold speed. The dashed-dot line of FIG. 5D indicates the Standard 50% Mode where the speed of the turret is increased to a 50% higher set speed SD than the SB threshold speed. The speed threshold SB is provided as the upper speed limit for the Standard Constant Mode, the set speed SC is the upper limit for the Standard 25% Mode, and the set speed SD is the upper limit for the Standard 50% Mode.

When the slope of the rate of speed of the turret 12 intersects with the abscissa, the dwell time begins, the turret is stationary, and some process of the machine is occurring, such as, without limitation, the pouch 22 is filling. Moreover, because of the constant amount of time it takes to fill the pouch 22, the dwell time remains constant between the different modes as illustrated in the corresponding figures. For the purposes of these graphs and for ease of explanation, the intersection of the ordinate and the abscissa depicts the turret 12 in a rotation at some point in time between stations.

As illustrated in FIG. 5D, the Standard 50% Mode has the highest set speed SD and is the first to complete the turret's 12 rotation into the next station, thus beginning the dwell time at T10. As discussed above, for explanatory purposes, the dwell time remains constant between the stations and the different modes. As a result, the Standard 50% Mode will also be the first to index the turret 12 into an acceleration at T13. Therefore, a higher output rate is realized even with a constant filling time to maximize the amount of a product that can be filled into the pouch 22.

The Standard 25% Mode is illustrated in FIG. 5B, as the next fastest set speed SC. In the Standard 25% Mode, the turret 12 begins to decelerate into a station after the deceleration of the Standard 50% Mode, and subsequently completing the turret's 12 rotation into the next station and beginning the dwell time at T11. As a result of the constant dwell time, the Standard 25% Mode begins to index and accelerate the turret 12 at T14, which is after T13 of the Standard 50% Mode but faster than T15 of the Standard Operation Mode. Therefore, there is still an increase in output rates while maximizing the amount of product being filled into the pouch 22.

The Standard Constant Mode, as illustrated in FIG. 5B, has the standard speed threshold speed SB and the standard dwell time. In the Standard Constant Mode, the turret 12 begins to decelerate into the station and begin the dwell time, at T12, after the Standard 50% Mode and the Standard 25% Mode. As a result, the Standard Constant Mode does not begin the filling process until well after the other two modes are already in the filling process. Further, the Standard Constant Mode begins to index and accelerate the turret 12 at T15, which is after both the Standard 50% Mode and the Standard 25% Mode. Therefore, the Standard Mode provides a constant rate of dwell and index that may be used, for example, as a baseline to determine whether the speed and/or the acceleration should be adjust to meet the desired output rate.

As discussed previously, the acceleration and/or deceleration of the turret 12 is at the same rate in all three modes of the Standard Mode Operation; however, the acceleration and/or may be changed depending on the type of product, the pouch, and/or the desired output rate. Further, the dwell times remain constant for all three modes; however, the dwell time may be changed depending on the mode, the type of pouch, the type of product, and/or the desired output rate.

Figure 6A:
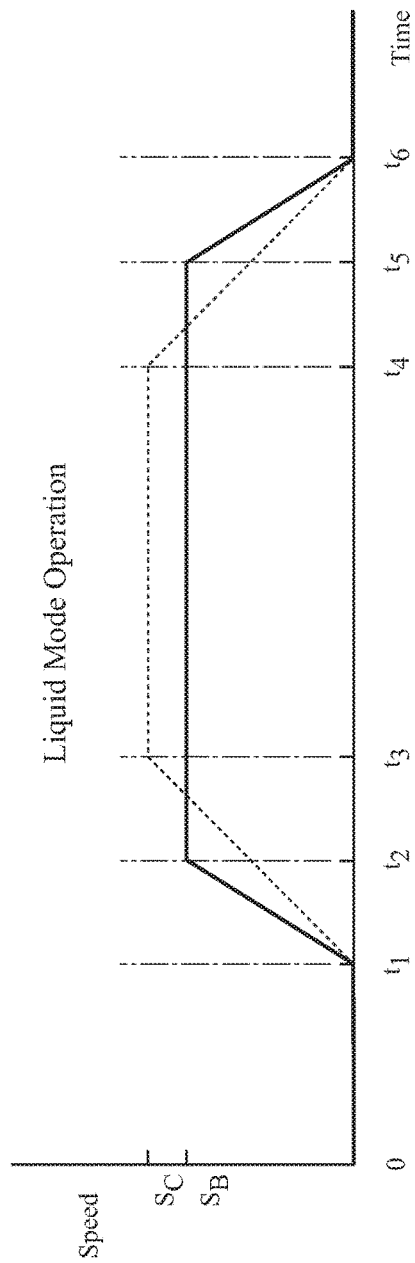
FIG. 6A is a graphical representation of the Liquid Operation depicting the Liquid Constant Mode and the Liquid 25% Mode of FIG. 4B, according to one or more embodiments described and illustrated herein.

FIG. 6A is a graphical representation of the Liquid Mode Operation recipe of step 312 depicting the Liquid Constant Mode and the Liquid 25% Mode of FIG. 5B. The abscissa is the total time of the operation and includes both the index and the dwell times. The ordinate is the speed in which the turret 12 is rotated. The solid line indicates the Liquid Constant Mode having a set threshold speed LB and a predetermined acceleration and deceleration speed. The dashed line indicates the Liquid 25% Mode, where the acceleration and deceleration of the turret 12 is elongated or more gradual than the acceleration and deceleration of the turret 12 in the Liquid Constant Mode, but the set speed LC of the turret 12 in the Liquid 25% Mode is illustrated as faster than the threshold set speed LB. It should be appreciated that the set speed LC of the Liquid 25% Mode, while illustrated as being faster, does not need to be faster and may have with an elongated or gradual acceleration/deceleration speed without increasing the set speed.

The lower speed threshold LB is provided as the upper speed limit for the Liquid Constant Mode and the faster set speed LC is the upper limit for the Liquid 25% Mode. As discussed earlier, the turret 12 is stationary, or at a dwell time during the station process, such as, without limitation, a pouch filling process. The dwell time remains constant between the two modes. For the purposes of this graph and for ease of explanation, the intersection of the ordinate and the abscissa is at some period of time within the filling process, at a dwell time, where the turret 12 is stationary.

As illustrated, both modes index the turret into an acceleration after filling the pouch at time T1. However, in the Liquid Constant Mode, the rate of acceleration is similar to the Standard Constant Mode. As such, when the acceleration reaches the LB threshold speed at T2 the turret 12 threshold speed LB is maintained until the deceleration into a station begins at T5.

On the other hand, the acceleration of Liquid 25% Mode is more gradual, thus taking more index time to achieve the LB speed. Further, because of the gradual acceleration, the Liquid 25% Mode may have the faster set speed LC. The gradual acceleration reaches the set speed LC at time T3, maintaining the turret 12 speed LC until the deceleration into a station begins at T4. The deceleration rate of the Liquid 25% Mode is also gradual, having an inverse relationship with the acceleration. That is, the acceleration rate of the turret 12 is equal to the inverse of the deceleration rate of the turret 12. Therefore, the deceleration rate of the turret in the Liquid 25% Mode begins sooner at T4 than the deceleration rate of the turret 12 in the Liquid Constant Mode at T5.

Both the Liquid Constant Mode and the Liquid 25% Mode turret 12 decelerations meet at the same time T6, where the turret 12 is now stationary, and the dwell time begins simultaneously for both modes. Therefore, in the next cycle, because the dwell times remain constant during the filling process, the accelerations of both the Liquid Constant Mode and the Liquid 25% Mode will begin together.

In addition, the third subroutine choice, the Liquid 50% Mode (not illustrated) would begin the acceleration of the turret 12 at same point in time T1 as the Liquid Constant Mode and the Liquid 25% Mode. However, the acceleration of the turret 12 would be an even greater elongation or more gradual than the acceleration of the turret 12 in the Liquid 25% Mode. In other words, the Liquid 50% Mode takes more index time to reach the LB and LC set speeds and would continue to accelerate the turret 12 to a set speed that may be beyond the set speeds LB and LC. Again, the deceleration rate of the turret 12 in the Liquid 50% Mode is also a greater elongation or more gradual than the deceleration of the turret 12 in the Liquid 25% Mode. The Liquid 50% Mode turret 12 deceleration has the same inverse relationship with its the turret 12 acceleration rate, therefore, the deceleration rate of the turret 12 in the Liquid 50% Mode would begin sooner than T4. As a result of the increased set speed, and the acceleration and deceleration principles discussed above, the Liquid 50% Mode turret 12 deceleration will meet at the same time T6 and begin the dwell time with the other modes. Therefore, in the next cycle, the Liquid 50% Mode will begin acceleration of the turret 12 together with the other modes.

It should be appreciated that the Liquid Operation Mode is not limited to the preset modes as described above. The Liquid Operation may be have a set speed value in any range, including above the Liquid 50% Mode, between the Liquid 50% Mode and the Liquid Constant Mode, or below the Liquid Constant Mode. Moreover, the Liquid Operation may be have an elongated or gradual acceleration, an elongated or gradual deceleration, or a combination thereof. Further yet, the rate of the acceleration and/or deceleration may be greater than or less than any of the predetermined acceleration/deceleration rates as described in the above modes. Further, based on the product being dispensed and/or the pouch, the dwell time may also be adjusted to fit the product fill time of the pouch.

Figure 6B:
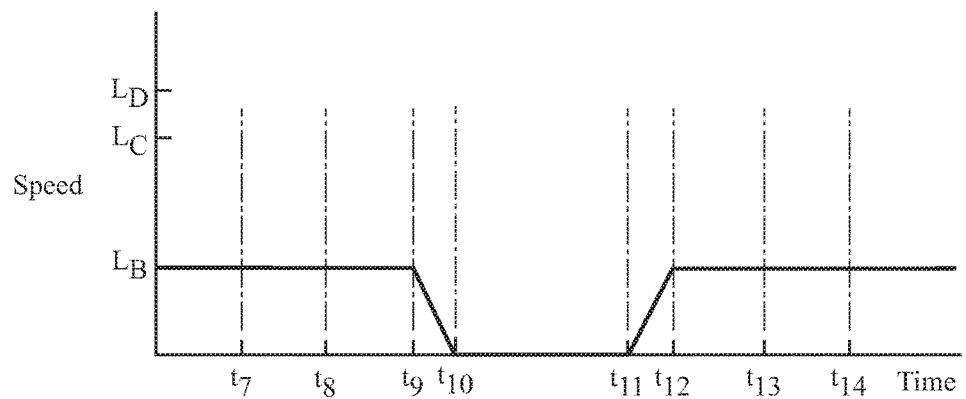
FIG. 6B is a graphical representation of the Liquid Operation Mode station-to-station operation of FIG. 4B, according to one or more embodiments described and illustrated herein.
Figure 6C:
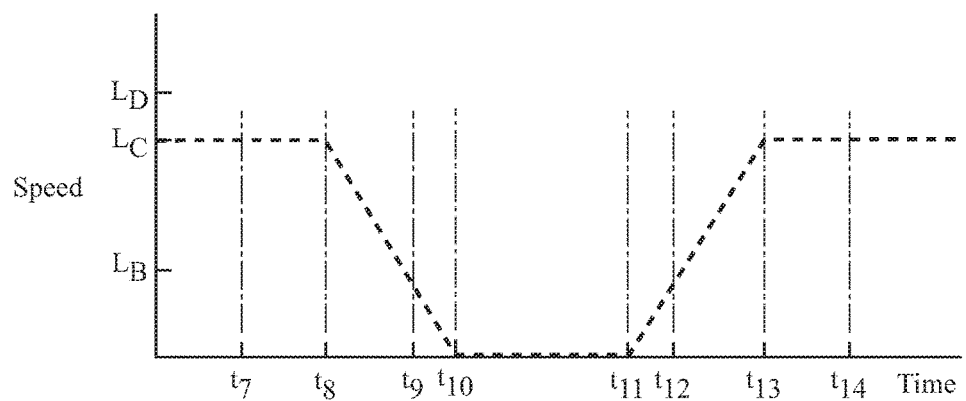
FIG. 6C is a graphical representation of the Liquid 25% Mode station-to-station operation of FIG. 4B, according to one or more embodiments described and illustrated herein.
Figure 6D:
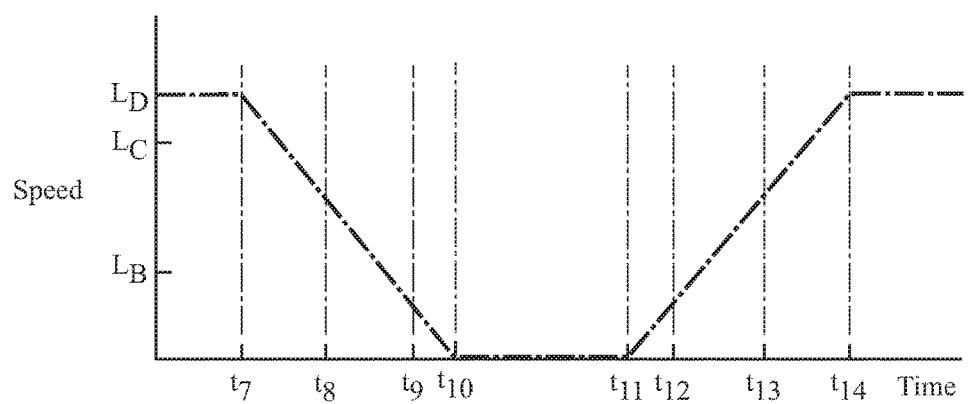
FIG. 6D is a graphical representation of the Liquid 50% Mode station-to-station operation of FIG. 4B, according to one or more embodiments described and illustrated herein.

FIGS. 6B, 6C, and 6D are a graphical representation of the Liquid Operation Mode, the Liquid 25% Mode, and the Liquid 50% Mode depicting a comparison between the station-to-station rotation of the turret of FIG. 4B. The abscissa is the total time of the operation and includes both the index and the dwell times. The ordinate is the speed in which the turret 12 is rotated. The solid line of FIG. 5B indicates the Liquid Constant Mode having a set threshold speed LB. The dashed line of FIG. 5C indicates the Liquid 25% Mode where the acceleration rate and the deceleration rate of the turret 12 is elongated by 25% and the speed of the turret 12 is increased to a faster set speed LC than the LB threshold speed. The dashed-dot line of FIG. 5D indicates the Liquid 50% Mode where the acceleration rate and the deceleration rate of the turret 12 is elongated by 50% and the speed of the turret 12 is increased to a faster set speed LD. The set speed LD is faster than both the LC and the LB speeds. The speed threshold LB is provided as the upper speed limit for the Liquid Constant Mode, the set speed LC is the upper limit for the Liquid 25% Mode, and the set speed LD is the upper limit for the Liquid 50% Mode.

When the slope of the rate of speed of the turret 12 intersects with the abscissa, the dwell time has begun, the turret 12 is stationary, and the pouch 22 is filling. Moreover, because of the constant fill time, the dwell time remains constant between the different modes as illustrated in the corresponding figures. For the purposes of these graphs and for ease of explanation, the intersection of the ordinate and the abscissa depicts the turret in rotation at some time period between stations.

As illustrated in FIG. 6D, the turret 12 in the Liquid 50% Mode has most gradual (longest with respect to time to achieve the set speed) deceleration and acceleration rate. As a result of the gradual acceleration and deceleration rate, the set speed LD for the rotation of the turret 12 may be increased. As such, the turret 12 deceleration in the Liquid 50% Mode is started before any other mode described herein, at time T7. The turret 12 deceleration continues until time T10 when the turret 12 enters the station and becomes stationary. The dwell time begins, and for illustrative purposes, the filling process of the pouch 22 begins. As a result of the gradual acceleration and deceleration of the turret 12, the likelihood of the product sloshing out of the pouch is significantly reduced. Further, as discussed above, because the liquid spill is reduced, the set speed may be increased.

The turret 12 in the Liquid 25% Mode, as illustrated in FIG. 6B, has a less gradual deceleration and less gradual acceleration slope when compared to the Liquid 50% Mode, but a more gradual deceleration and acceleration slope than the Liquid Constant Mode. Moreover, the turret 12 in the Liquid 25% Mode may have a faster set speed LC than the Liquid Constant Mode threshold speed LB. The turret 12 deceleration in the Liquid 25% Mode occurs after the turret 12 is rotated at set speed LC, at time T8. The turret 12 is continuously decelerated until time T10, when the pouch 22 reaches the desired station. The turret 12 is now stationary, the dwell time begins and, for illustrative purposes, the filling process of the pouch 22 begins. As a result of the turret 12 gradual acceleration and deceleration, in the Liquid 25% Mode, the likelihood of the product sloshing out of the pouch is reduced and, as discussed above, because the liquid spill is reduced, the set speed may be increased.

The turret 12 in the Liquid Standard Mode, as illustrated in FIG. 6C, has a normal deceleration and acceleration slope having normal index and dwell times which are governed by the machine speed. The turret 12 deceleration and acceleration slopes of the Liquid Standard Mode are steep, meaning that the turret 12 is accelerated into the threshold speed LB quickly when compared to the Liquid 25% Mode and the Liquid 50% Mode. As a result of the steep deceleration slope, the turret 12 is at a deceleration at T9, which is just before the pouch 22 is in the station, and just before the dwell time begins at time T10.

As illustrated in the graph, all three modes, while having distinct turret 12 deceleration slopes, begin the dwell time at T10. The dwell time is constant therefore, all the modes require the same filling time to maximize the product level in the pouch. Therefore, each mode will also begin the turret 12 acceleration at the same time T11. As a result of the turret 12 acceleration slopes, the Liquid Operation Mode will reach the turret 12 set speed LB first at T12, followed by the Liquid 25% Mode at T13, and then the Liquid 50% Mode at T14.

As discussed previously the Liquid Operation Mode is not limited to the preset modes as described above. The Liquid Operation may rotate the turret 12 with any combination of a set speed, a gradual or steep acceleration slope, and/or a gradual or steep deceleration slope. It should be appreciated that the servomotor 14 provides for an almost continuous filling motion as described herein thus removing any concern of the 'schloss' effect affecting a product.

Figure 7:
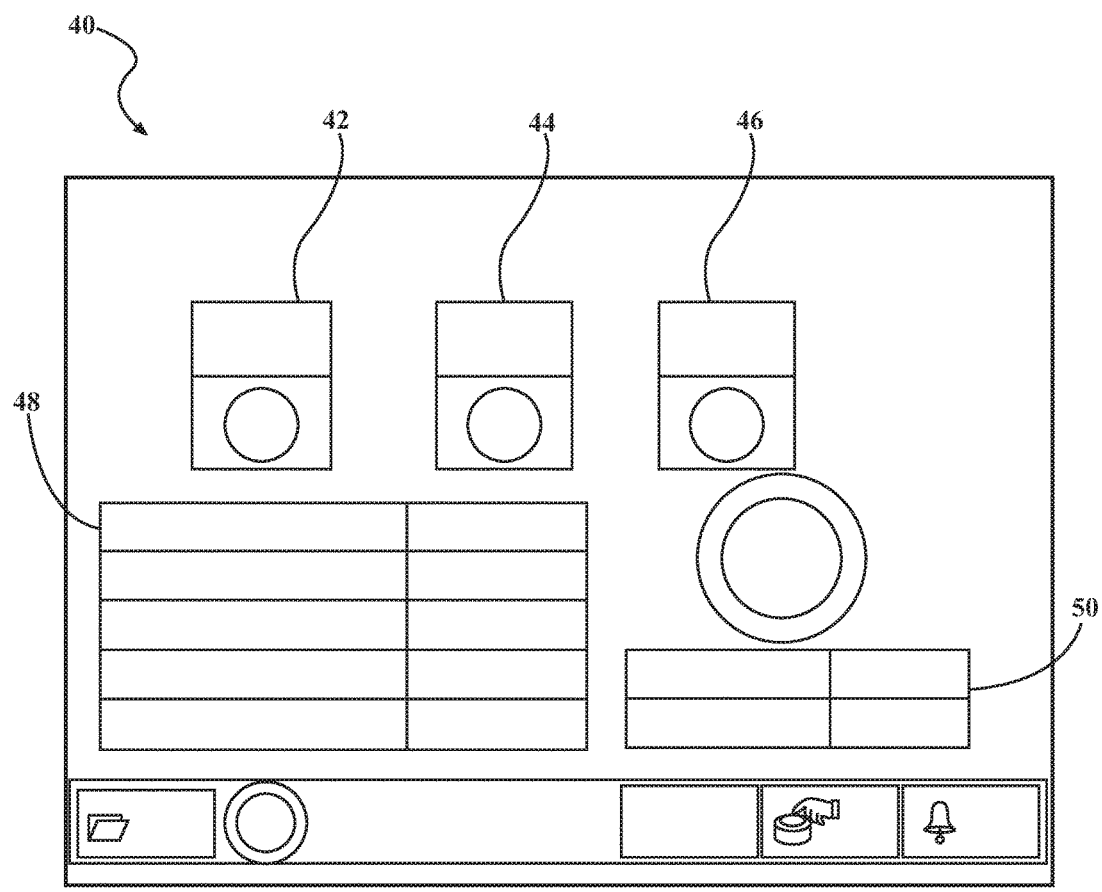
FIG. 7 schematically depicts a screen view of a user panel, according to one or more embodiments described and illustrated.

FIG. 7 schematically depicts a screen view a user panel displaying a plurality of user selections and information. As illustrated, and without limitation, the screen view 40 includes three pushbuttons 42, 44, 46 that corresponding to a specific mode, as discussed above. The pushbuttons, when depressed, communicate with the logic module 30a selecting the subroutine. As an illustrative example, the screen may also include an information box 48 that provides the user with a plurality of information, such as, without limitation, the production speed, the servo speed, whether a fault or error has occurred, and the production status. Moreover, the screen 40 may contain a secondary box 50 that displays information, such as, without limitation, the timing or production rate with the set dwell time and the production rate with the travel section.

It should be appreciated that the because of the plurality of parameters discussed herein, the servomotor 14 may convert an intermittent form-seal machine 10 into a continuous form-seal machine 10. Further, because of the servomotor 14 and the flexibility of the parameters, the fill-seal machine 10 may not require changing over to run multiple containers within a selected operation. The machine 10 can detect a plurality SKU's for a customer and process that recipe and expected output per minute based upon that particular products fill rate.

The present invention has been described in an illustrative manner. It is to be understood that the terminology which has been used is intended to be in the nature of words of description rather than of limitation.

Many modifications and variations of the present invention are possible in light of the above teachings. Therefore, the present invention may be practiced other than as specifically described.

I claim:

1. A machine for filling and sealing a flexible pouch comprising:
   a turret having a plurality of stations for positioning a plurality of flexible pouches at the plurality of stations along a path defined by the turret;
   a servomotor operably connected to rotate the turret; and
   a control unit operably connected to control the servomotor, the control unit having a memory component and a processor, the memory component coupled to the processor, the memory component stores a logic module that when executed by the processor, causes the servomotor to operate, the logic module having a first operation and a second operation, wherein each operation corresponds to a type of product to fill the flexible pouch and each operation corresponds to a desired rate of acceleration of the turret, a desired rate of deceleration of the turret, and a predetermined speed of rotation of the turret to advance the flexible pouch to a next station of the plurality of stations along the path, each of the first and second operations include a first mode, a second mode, and a third mode,
   wherein each of the first, second and third modes has a respective ramp up time, a respective ramp down time, and a respective predetermined threshold speed that the servomotor rotates the turret in a direction during operation of the servomotor and each of the respective ramp up time, the respective ramp down time, and the respective predetermined threshold speed is different for each mode.

2. The machine for filling and sealing the flexible pouch of claim 1, wherein the logic module further includes an index time and a dwell time to control the speed of rotation of the servomotor for each mode, the index time is a first time it takes to rotate the turret in the direction, the dwell time is a second time that the turret is stationary.

3. The machine for filling and sealing the flexible pouch of claim 2, wherein the ramp up time is an amount of time it takes for the turret to accelerate to the predetermined threshold speed during the index time, and the ramp down time is an amount of time it takes for the turret to decelerate into the dwell time.

4. The machine for filling and sealing the flexible pouch of claim 3, wherein the first mode of the first operation instructs the servomotor to rotate the turret at the predetermined threshold speed by having a constant rate of the index time and a constant rate of the dwell time.

5. The machine for filling and sealing the flexible pouch of claim 4, wherein the second mode of the first operation instructs the servomotor to rotate the turret at a first increased set speed, the first increased set speed is faster than the predetermined threshold speed and the constant rate of the dwell time remains the same rate of time as the constant rate of the dwell time of the first mode of the first operation.

6. The machine for filling and sealing the flexible pouch of claim 5, wherein the third mode of the first operation instructs the servomotor to rotate the turret at a second increased set speed, the second increased set speed is faster than the first increased set speed and the constant rate of the dwell time remains the same rate of time as the constant rate of the dwell time of the first mode of the first operation.

7. The machine for filling and sealing the flexible pouch of claim 3, wherein the first mode of the second operation instructs the servomotor to rotate the turret with a predetermined ramp up speed, a predetermined ramp down speed, and at the predetermined threshold speed having a constant rate of the index time and a constant dwell time.

8. The machine for filling and sealing the flexible pouch of claim 7, wherein the second mode of the second operation instructs the servomotor to rotate the turret with a first decreased ramp up speed and a first decreased ramp down speed and at a first predetermined threshold speed, the first decreased ramp up speed is a slower acceleration than the predetermined ramp up speed, the first decreased ramp down speed is a slower deceleration than the predetermined ramp down speed, and the first predetermined threshold speed is a faster speed than the predetermined threshold speed.

9. The machine for filling and sealing the flexible pouch of claim 8, wherein the third mode of the second operation instructs the servomotor to rotate the turret with a second decreased ramp up speed, a second decreased ramp down speed, and a second predetermined threshold speed, the second decreased ramp up speed is a slower acceleration than the first decreased ramp up speed, the second decreased ramp down speed is a slower deceleration than the first decreased ramp up speed and the second predetermined threshold speed is faster than the first predetermined threshold speed.

10. The machine for filling and sealing the flexible pouch of claim 8, wherein the second operation is for a liquid type of product to fill the flexible pouch and each respective mode of the second operation is configured to reduce an amount of liquid that is splashed from the flexible pouch between a start and stop of the turret operating between the plurality of stations.

11. The machine for filling and sealing the flexible pouch of claim 3, further comprising:
   a third operation,
   wherein the third operation operates based upon a user input for an amount of fills per minute, the index time and the dwell time automatically adjust to fulfill the amount of fills per minute.

12. A system for a machine comprising:
   a turret having a plurality of stations for positioning a plurality of flexible pouches at the plurality of stations along a path defined by the turret;
   a servomotor operably connected to rotate the turret;
   a control unit operably connected to control the servomotor, the control unit having a memory component, a data storage, and a processor; the memory component coupled to the processor, the memory component stores a logic module that when executed by the processor, causes the servomotor to operate, the logic module having a first operation and a second operation, wherein each operation corresponds to a type of product to fill the flexible pouch and each operation includes a desired rate of acceleration of the turret, a desired rate of deceleration of the turret, and a predetermined speed of rotation of the turret to advance the flexible pouch to a next station of the plurality of stations along the path, each of the operations having a first mode, a second mode, and a third mode; and a plurality of sensors configured to monitor a production process, the plurality of sensors provides the control unit with a production data, wherein each of the modes has a respective ramp up time, a respective ramp down time and a respective predetermined threshold speed that the servomotor rotates the turret in a direction during operation of the servomotor and each of the respective ramp up time, the respective ramp down time, and the respective predetermined threshold speed is different for each mode.

13. The machine for filling and sealing the flexible pouch of claim 12, wherein the logic module further includes an index time and a dwell time to control the speed of rotation of the servomotor, the index time is a first time it takes to rotate the turret, the dwell time is a second time that the turret is stationary.

14. The system for the machine of claim 13, wherein the logic module decreases an acceleration speed during the index time to achieve a threshold set speed, the logic module decreases a deceleration speed during the index time to achieve the dwell time.

15. The machine for filling the flexible pouch of claim 14, wherein upon a selection initiated at a user panel the first mode of the first operation controls the servomotor to rotate the turret at the predetermined threshold speed by a constant rate of the index time and a constant rate of dwell time, the second mode of the first operation controls the servomotor to rotate the turret at a first increased predetermined threshold speed and the constant rate of the dwell time remains the same rate of time as the constant rate of the dwell time of the first mode of the first operation, and the third mode of the first operation controls the servomotor to rotate the turret at a second increased predetermined threshold speed and the constant rate of the dwell time remains the same rate of time as the constant rate of the dwell time of the first mode of the first operation, the second increased predetermined threshold speed is faster than the first increased predetermined threshold speed.

16. The machine for filling the flexible pouch of claim 14, wherein:

upon a selection initiated at a user panel the first mode of the second operation causes the servomotor to rotate the turret with a constant acceleration rate and a constant deceleration rate at a predetermined speed threshold;

the second mode of the second operation causes servomotor to rotate the turret with a first decreased acceleration rate and a first decreased deceleration rate at a first increased predetermined speed threshold that is faster than the predetermined speed threshold, the first decreased acceleration rate is slower than the constant acceleration rate and the first decreased deceleration rate is slower than the constant deceleration rate; and the third mode of the second operation causes servomotor to rotate the turret with a second decreased acceleration rate and a second decreased deceleration rate at a second increased predetermined speed threshold that is faster than the first predetermined speed threshold, the second decreased acceleration rate is slower than the first decreased acceleration rate, the second decreased deceleration rate is slower than the second decreased acceleration rate.

17. The machine for filling the flexible pouch of claim 14, further comprising:

a third operation, wherein upon a selection initiated at a user panel, the third operation operates based upon a user input for an amount of fills per minute, the index time, the dwell time, the acceleration speed and the deceleration speed of the logic module are adjusted to automatically adjust the turret speed to fulfill the amount of fills per minute.

18. The machine for filling the flexible pouch of claim 14, wherein the second operation is for a liquid type of product to fill the flexible pouch and each respective mode of the second operation is configured to reduce an amount of liquid that is splashed from the flexible pouch between a start and stop of the turret operating between the plurality of stations.

\* \* \* \* \*